United States Patent
Evans et al.

(10) Patent No.: US 10,289,432 B2
(45) Date of Patent: May 14, 2019

(54) ADAPTIVELY LINKING DATA BETWEEN INDEPENDENT SYSTEMS BASED ON A UNIFORM RESOURCE LOCATOR

(71) Applicant: salesforce.com, inc., San Francisco, CA (US)

(72) Inventors: Adam Evans, Redwood City, CA (US); Ankush Goyal, San Mateo, CA (US)

(73) Assignee: salesforce.com, inc., San Francisco, CA (US)

( * ) Notice: Subject to any disclaimer, the term of this patent is extended or adjusted under 35 U.S.C. 154(b) by 55 days.

(21) Appl. No.: 15/448,449

(22) Filed: Mar. 2, 2017

(65) Prior Publication Data
US 2018/0253319 A1 Sep. 6, 2018

(51) Int. Cl.
| | |
|---|---|
| *G06F 17/00* | (2006.01) |
| *G06F 9/451* | (2018.01) |
| *G06F 17/30* | (2006.01) |
| *G06F 21/60* | (2013.01) |
| *H04L 29/08* | (2006.01) |
| *G06F 8/38* | (2018.01) |

(Continued)

(52) U.S. Cl.
CPC ........ *G06F 9/451* (2018.02); *G06F 17/30864* (2013.01); *G06F 17/30887* (2013.01); *G06F 17/30893* (2013.01); *G06F 17/30896* (2013.01); *G06F 21/604* (2013.01); *G06F 8/38* (2013.01); *G06F 9/44526* (2013.01); *G06F 21/6218* (2013.01); *H04L 67/02* (2013.01); *H04L 67/08* (2013.01); *H04L 67/36* (2013.01); *H04L 67/38* (2013.01)

(58) Field of Classification Search
CPC ......... G06F 17/30887; G06F 17/30893; G06F 17/30864; G06F 17/30896; G06F 21/604; G06F 9/451
See application file for complete search history.

(56) References Cited

U.S. PATENT DOCUMENTS

| | | | | |
|---|---|---|---|---|
| 6,115,040 A | * | 9/2000 | Bladow | G06F 11/0709 707/E17.107 |
| 2001/0029527 A1 | * | 10/2001 | Goshen | G06F 17/30899 709/218 |

(Continued)

OTHER PUBLICATIONS

Coad, Noah, "Register a Custom URL Protocol Handler", Oct. 19, 2006, Microsoft, 16 pages https://blogs.msdn.microsoft.com/noahc/2006/10/19/register-a-custom-url-protocol-handler/.*

*Primary Examiner* — Cesar B Paula
*Assistant Examiner* — David Faber
(74) *Attorney, Agent, or Firm* — Holland & Hart LLP (57) ABSTRACT

A method for data processing may include receiving a universal resource locator (URL) from a web browser, where the URL corresponds to a first system, and identifying an attribute of the URL, where the attribute of the URL comprises a domain of the URL, a path of the URL, one or more parameters of the URL, or a combination thereof. The method may further include selecting a data handler based at least in part on the identified attribute of the URL and generating an augmented set of data based on a first set of data from the first system and a second set of data from a second system, where the augmented set of data is generated using the data handler. The method may further include modifying a display of an extension of the web browser based on the augmented set of data.

20 Claims, 8 Drawing Sheets (51) Int. Cl.
  *G06F 9/445* (2018.01)
  *G06F 21/62* (2013.01)
  *H04L 29/06* (2006.01)

(56) References Cited

U.S. PATENT DOCUMENTS

| | | | | |
|---|---|---|---|---|
| 2002/0103820 | A1* | 8/2002 | Cartmell | G06F 17/273 |
| | | | | 715/260 |
| 2004/0267739 | A1* | 12/2004 | Dowling | G06F 17/2247 |
| 2008/0222295 | A1* | 9/2008 | Robinson | G06F 17/30867 |
| | | | | 709/227 |
| 2009/0113378 | A1* | 4/2009 | Boyer | G06F 8/20 |
| | | | | 717/101 |
| 2010/0268694 | A1* | 10/2010 | Denoue | G06F 17/30873 |
| | | | | 707/693 |
| 2012/0311525 | A1* | 12/2012 | Xoual | G06Q 10/06 |
| | | | | 717/104 |
| 2017/0220532 | A1* | 8/2017 | Soon-Shiong | G06Q 30/02 |
| 2018/0091546 | A1* | 3/2018 | Davidson | G06F 17/30899 |

* cited by examiner

ADAPTIVELY LINKING DATA BETWEEN INDEPENDENT SYSTEMS BASED ON A UNIFORM RESOURCE LOCATOR

FIELD OF TECHNOLOGY

The present disclosure relates generally to database systems and data processing, and more specifically to adaptively linking data between independent systems based on a uniform resource locator (URL).

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may include one or more systems that store data regarding a customer. Additional data associated with the customer may be stored in one or more secondary systems, which may be a part of the cloud platform, or outside of the cloud platform. In some cases, a user attempting to access customer data stored in multiple different systems may experience difficulty due to differing network credentials, permissions, or data formats between the systems. In such cases, the user may be unable to access some of the customer data, or may have to manually log into and out of multiple different systems to access all the relevant customer data.

DETAILED DESCRIPTION

Data associated with a customer may be stored on multiple different systems. For example, one system may store data associated with a customer's account and billing information while another system may store data associated with a customer's technical support inquiries and history. The different systems may be operated by the same entity (e.g., different departments within the same company) or may be operated by different entities. In some cases, the different systems may have different network credentials, permissions, data formats, or a combination of these factors. As a result, to access, view, or manipulate the data from the different systems, a user may have to separately log into and out of the different systems and manually copy data over from one system into another system.

In accordance with aspects of the present disclosure, a system may be configured to bridge together multiple different systems so that the data from one system can be accessed and imported into another system. For example, a user may access a page or file of a first system via a web browser and a uniform resource locator (URL). The web browser may support an extension configured to allow the user operating within the first system to access data from a second system (e.g., a page or file on a different network). The extension may also facilitate actions for the user to take, such as importing data, exporting data, or augmenting data from one system for display in another system.

The web browser extension may operate based on one or more attributes of a URL. For example, the extension may select a data handler, facilitate certain actions, and/or adapt its user interface based on an attribute of the URL. That is, the functionality and appearance of the extension may adaptively change based on the URL of a page from which the extension is launched. The attributes of the URL may include a domain of the URL, a path of the URL, a parameter of the URL, or a combination of these. The extension may generate an augmented set of data by reading data from a second system and converting the data so that it may be combined with data from a first system. The extension may display the augmented set of data and one or more actions that the user may perform. In some cases, a user may modify the extension by adding new data handlers or new actions.

Aspects of the disclosure are initially described in the context of environments supporting adaptively linking data between independent systems based on a URL. Aspects of the disclosure are then described in the context of a user interface (UI). Aspects of the disclosure are further illustrated by and described with reference to apparatus diagrams, system diagrams, and flowcharts that relate to adaptively linking data between independent systems based on a URL.

Figure 1:
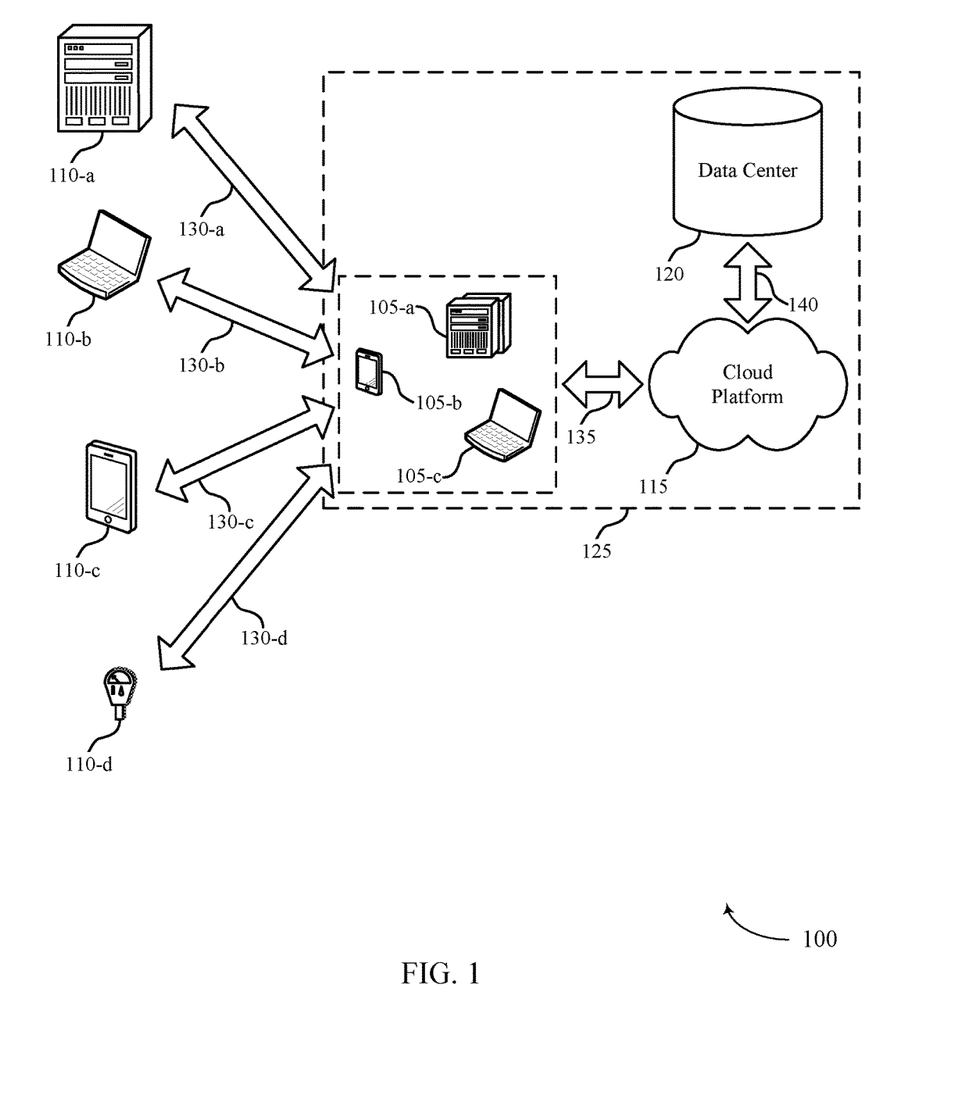
FIGS. 1 through 2 illustrate examples of environments for communication data processing that support adaptively linking data between independent systems based on a uniform resource locator (URL) in accordance with aspects of the present disclosure.

FIG. 1 illustrates an example of an environment 100 for cloud computing that supports adaptively linking data between independent systems based on a URL in accordance with various aspects of the present disclosure. The environment 100 includes cloud clients, contacts, cloud platform 115, and data center 120. Cloud platform 115 may be an example of a public or private cloud network. A cloud client may access cloud platform 115 over network connection 135. The network may implement transfer control protocol and internet protocol (TCP/IP), such as the Internet, or may implement other network protocols. A cloud client may be an example of a user device, such as a server (e.g., cloud client 105-*a*), a smartphone (e.g., cloud client 105-*b*), or a laptop (e.g., cloud client 105-*c*). In other examples, a cloud client may be a desktop computer, a tablet, a sensor, or another computing device or system capable of generating, analyzing, transmitting, or receiving communications. In some examples, a cloud client may be operated by a user that is part of a business, an enterprise, a non-profit, a startup, or any other organization type.

A cloud client may interact with multiple contacts. The interactions may include communications, opportunities, purchases, sales, or any other interaction between a cloud client and a contact. Data may be associated with the interactions. A cloud client may access cloud platform 115 to store, manage, and process the data associated with the interactions. In some cases, the cloud client may have an associated security or permission level. A cloud client may have access to certain applications, data, and database information within cloud platform 115 based on the associated security or permission level, and may not have access to others.

Contacts may interact with the cloud client in person or via phone, email, web, text messages, mail, or any other appropriate form of interaction (e.g., interactions 130-*a*, 130-*b*, 130-*c*, and 130-*d*). The interaction may be a business-to-business (B2B) interaction or a business-to-consumer (B2C) interaction. A contact may also be referred to as a customer, a potential customer, a lead, a client, or some other suitable terminology. In some cases, the contact may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact may be another computing system. In some cases, the contact may be operated by a user or group of users. The user or group of users may be associated with a business, a manufacturer, or any other appropriate organization.

Cloud platform 115 may offer an on-demand database service to the cloud client. In some cases, cloud platform 115 may be an example of a multi-tenant database system. In this case, cloud platform 115 may serve multiple cloud clients with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions from the cloud client over network connection 135, and may store and analyze the data. In some cases, cloud platform 115 may receive data directly from an interaction between a contact and the cloud client. In some cases, the cloud client may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client or an interaction between a contact and the cloud client. Data center 120 may utilize multiple redundancies for security purposes. In some cases, the data stored at data center 120 may be backed up by copies of the data at a different data center (not pictured).

System 125 may include cloud clients, cloud platform 115, and data center 120. In some cases, data processing may occur at any of the components of system 125, or at a combination of these components. In some cases, servers may perform the data processing. The servers may be a cloud client or located at data center 120.

In some cases, environment 100 may include multiple systems 125. The multiple systems 125 may be examples of independent systems. For example, the multiple systems 125 may be operated by different entities or may be operated by the same entity but may require separate login credentials to access each system 125. Each of the multiple systems 125 may store data from a same contact in a particular data format associated with that independent system 125. A cloud client may be operating in a first system 125 and receive data associated with a contact. The cloud client may select to link data from a second system 125 with relevant data associated with the same contact to the first system 125. As described in more detail below, a web browser may support an extension configured to perform the linking operation (e.g., importing, exporting, or augmenting data between two systems 125). The web browser extension may link data and convert data formats from the second system 125 to the first system 125 based on a URL of a web browser operating in one of the systems 125. Therefore, the web browser extension may reduce or eliminate the need to separately log into and copy data from various different systems to retrieve relevant data for a particular contact.

Figure 2:
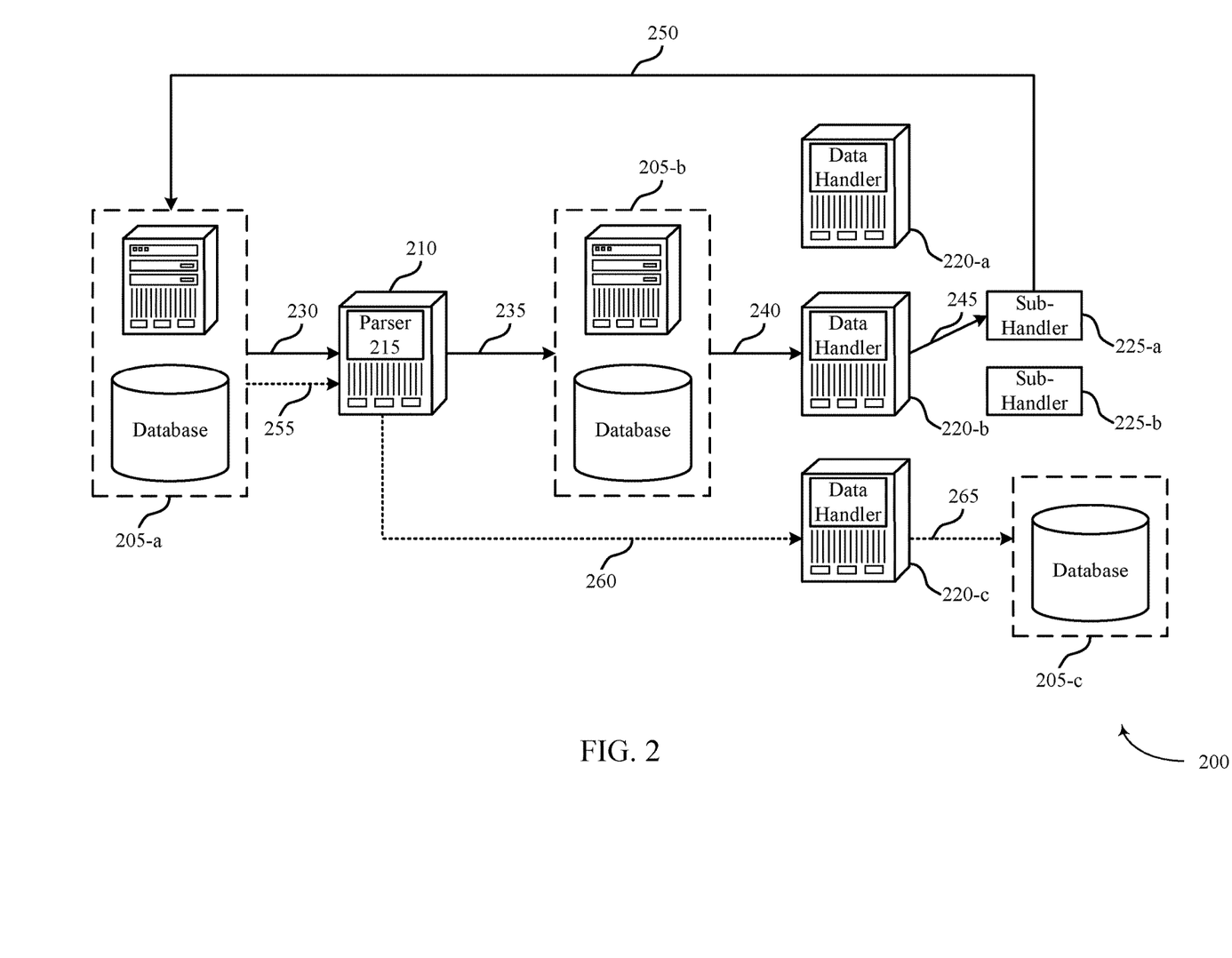

FIG. 2 illustrates an example of an environment 200 that supports adaptively linking data between multiple systems based on a URL in accordance with various aspects of the present disclosure. Environment 200 may include multiple systems (e.g., systems 205-*a*, 205-*b*, and 205-*c*), which may each be an example of a system 125 as described with respect to FIG. 1. Each system may include one or more components (e.g., servers and databases) that store data and may be accessible over a network (e.g., the Internet). Environment 200 may also include multiple data handlers (e.g., data handlers 220-*a*, 220-*b*, and 220-*c*) and a bridge server 210, which may include a parser 215. In some cases, environment 200 may include fewer or more data handlers than those shown in FIG. 2. Each data handler may be associated with one or more sub-handlers. For example, data handler 220-*b* may be associated with sub-handlers 225-*a* and 225-*b*. In some cases, a data handler may not be associated with any sub-handlers. The environment 200 may be configured to select a data handler and/or a sub-handler based on one or more attributes of a URL to link data between multiple systems.

A web browser (e.g., Chrome™ browser) may be used to view and/or edit data within a file, webpage, or resource of a first system 205-*a*. The web browser may locate the file within the first system 205-*a* using a URL. The URL may include one or more attributes or components, including a protocol, a domain, a path, and one or more parameters. The protocol of the URL may indicate which protocol to use to access the file and may be followed by a colon (e.g., "http:"). The domain of the URL may specific the web address where the file is located and may be preceded by two forward slashes (e.g., "//www. example.com"). The path of the URL may specify a subdirectory on a server where the file is located and may be preceded by a single forward slash. A parameter of the URL may contain a query string preceded in the URL by a question mark. In some examples, the URL may include only a subset of these attributes.

The web browser may support use of a browser extension. An extension may be a program (e.g., a plug-in) that augments the functionality of the web browser. In some examples, the extension may be downloaded locally to a machine running the browser. The extension may be enabled and accessed by user account information such as a username and a password. The extension may be configured to access one or more systems. For example, a user may enter login credentials into the extension for both a first system 205-a and a second system 205-b.

A user may launch the extension (e.g., by clicking a button in the web browser) while accessing data (e.g., a particular file) within the first system 205-a. As described in more detail below, the extension may be configured to link data between the first system 205-a and the second system 205-b based on the URL of the file being viewed when the extension was launched or when an action to link two systems is taken by the user. In some examples, the extension may link data between two systems in response to actions taken by the user (e.g., selecting buttons in the extension). In other examples, the extension may automatically link data between the first system 205-a and the second system 205-b. To link data between the first system 205-a and the second system 205-b, the extension may be configured to send an indication of the URL of the file being viewed when the extension was launched to a bridge server 210 over communication link 230. In some cases, the extension may be configured to additionally send some or all of the data associated with the URL in the first system 205-a to the bridge server 210 over communication link 230.

The bridge server 210 may receive the indication of the URL associated with the first system 205-a. The bridge server 210 may include a parser 215. The parser 215 may parse the URL into separate attributes or components (e.g., the domain, the path, and one or more parameters). The bridge server 210 may determine a data handler (e.g., from multiple data handlers) for linking data between the first system 205-a and the second system 205-b based on one or more components of the URL. A data handler may be a program or process configured to convert data from one system (e.g., system 205-a) to a second system (e.g., system 205-b). In some cases, a data handler may additionally combine the converted data from the one system with data from the second system to generate an augmented set of data.

The bridge server 210 may select a data handler based on the domain of the URL, the path of the URL, the parameters of the URL, or a combination of these components. For example, the bridge server 210 may select data handler 220-b from data handlers 220-a, 220-b, and 220-c based on the domain of the URL. The bridge server 210 may further select sub-handler 225-a from sub-handlers 225-a and 225-b based on, for example, the path of the URL.

In some cases, bridge server 210 may send an indication of the selected data handler 220-b and the selected sub-handler 225-a to the second system 205-b over communication link 235. Additionally or alternatively, bridge server 210 may send an indication of the URL and the data corresponding to the first system 205-a to the second system 205-b over communication link 235. The second system 205-b may identify relevant data corresponding to the first system 205-a. For example, the second system 205-b may identify data that corresponds to a customer for which the first system 205-a also has data. In some cases, the identification may be based on the URL or the data corresponding to first system 205-a (e.g., the URL may identify the particular customer for which relevant data on the second system 205-b is being sought). The second system 205-b may send the relevant data on the second system 205-b to the selected data handler 220-b over communication link 240. Additionally, in some cases, the second system 205-b may send the data corresponding to first system 205-a to data handler 220-b over communication link 240.

The selected data handler 220-b may convert the relevant data corresponding to the second system 205-b. For example, the first system 205-a may store data according to a first data format, and the relevant data corresponding to the second system 205-b may be stored according to a second data format that corresponds to the second system 205-b. The selected data handler 220-b may convert the relevant data corresponding to the second system 205-b from the second data format to the first data format. In some cases, the selected data handler 220-b may generate an augmented set of data, including the converted relevant data corresponding to the second system 205-b and the data corresponding to the first system 205-a.

The selected data handler 220-b may send the converted relevant data corresponding to the second system 205-b and/or the augmented set of data to the selected sub-handler 225-a over communication link 245. The selected sub-handler 225-a may perform processing of the received data similar to the selected data handler 220-b. In some cases, the selected sub-handler 225-a may perform additional processing of the converted relevant data corresponding to the second system 205-b or the augmented set of data. The selected sub-handler 225-a may send the augmented set of data back to the first system 205-a over communication link 250.

The web browser may display the augmented set of data to a user in a user interface of the web browser extension. Additionally, the web browser extension may display one or more actions based on the URL, the first system 205-a, the second system 205-b, the augmented set of data, or a combination of these. In accordance with the above examples, the web browser extension may facilitate importing and augmenting data from one system to another by selecting the appropriate data handlers and sub-handlers based on attributes of a URL. The extension may therefore allow a user to see and manipulate data from a second system while still operating within a first system, which may eliminate the need to separately log into the second system to retrieve the relevant data.

In some cases, a user may select an action to perform associated with the web browser extension. For example, the user may click on an action button within the extension. In one example, the selected action may instruct the first system 205-a to write the augmented set of data to a third system 205-c. In this example, the augmented set of data may be sent to the bridge server 210 over communication link 255. Additionally, an indication of the URL or the selected action may be sent over communication link 255 to the bridge server 210.

The bridge server 210 may determine a data handler to perform the action based on the URL (e.g., with further processing by the parser 215) or the selected action. For example, the bridge server 210 may select data handler 220-c. The bridge server may send the augmented set of data to the selected data handler 220-c over communication link 260. The selected data handler 220-c may convert the augmented set of data from the first data format to a third data format corresponding to the third system 205-c. The selected data handler 220-c may then send the converted augmented set of data to the third system 205-c over communication link 265. In some cases, the third system 205-c may store the converted augmented set of data in a database.

In one example, the first system 205-*a* may be a Salesforce® computing system. A user may be viewing a particular file within the first system 205-*a* using a web browser. The particular file may be identified and accessed within the first system 205-*a* using a URL. The file may contain account information for a particular customer. The user may wish to view, import, and/or manipulate data from other systems related to the particular customer without having to log out of the first system 205-*a* and log into the other systems (e.g., by logging into a different virtual private network (VPN)). The user may launch the web browser extension as described above while viewing the file. In accordance with aspects of the present disclosure, the web browser extension may be configured to select the appropriate data handlers to retrieve, convert, or otherwise manipulate the relevant data from the other systems so that the user may view the relevant data and take further action from within the first system 205-*a*.

For example, the user may wish to view relevant data associated with the customer that is stored in a second system 205-*b* (e.g., a ZoomInfo® computing system). The user may enter the appropriate login credentials for the second system 205-*b* into the web browser extension. In some examples, the web browser extension may save the login credentials for future access requests. The user may then take some action (e.g., click a button within the extension) to cause the web browser extension to generate an augmented set of data between the first system 205-*a* and the second system 205-*b*.

As described above, the bridge server 210 may select the appropriate data handler and/or sub-handler to retrieve data from the second system 205-*b* based on the URL of the file within the first system 205-*a*. For example, the bridge server 210 may select data handler 220-*b* to convert data from a ZoomInfo data format to a Salesforce data format based on the domain of the URL, which indicates that the file is from a Salesforce computing system.

Additionally, the bridge server 210 may select sub-handler 225-*a* based on one or more parameters of the URL, which may indicate the particular customer associated with the file being viewed in the first system 205-*a*. The selected sub handler 225-*a* may be configured to retrieve only data from the second system 205-*b* associated with the particular customer identified by the URL. The selected data handler 220-*b* and the selected sub-handler 225-*a* may send an augmented set of data from the two systems for the particular customer to the first system 205-*a*. For example, the augmented set of data may include some or all the data from the first system 205-*a* for the particular customer along with some or all of the data from the second system 205-*b* for the particular customer.

The web browser extension may display the augmented set of data in addition to the original data associated with the file being viewed in the first system 205-*a*. The web browser extension may also display actions the user may take based on the extension, the URL, the first system 205-*a*, the second system 205-*b*, the augmented set of data, or a combination of these.

For example, an action may instruct the web browser extension to write the augmented set of data to a third party project management tool (e.g., Jira®). The user may select the action, and in response, the web browser extensions may send the augmented set of data and an indication of the selected action to the bridge server 210. The bridge server may select data handler 220-*c* based on the augmented set of data, the indication of the selected action, or a combination of the two. The bridge server 210 may send the augmented set of data to the selected data handler 220-*c*. The selected data handler 220-*c* may convert the augmented set of data to a Jira data format. The selected data handler 220-*c* may send the converted augmented set of data to the third system 205-*c*, which may then file the converted augmented set of data in a database.

Figure 3:
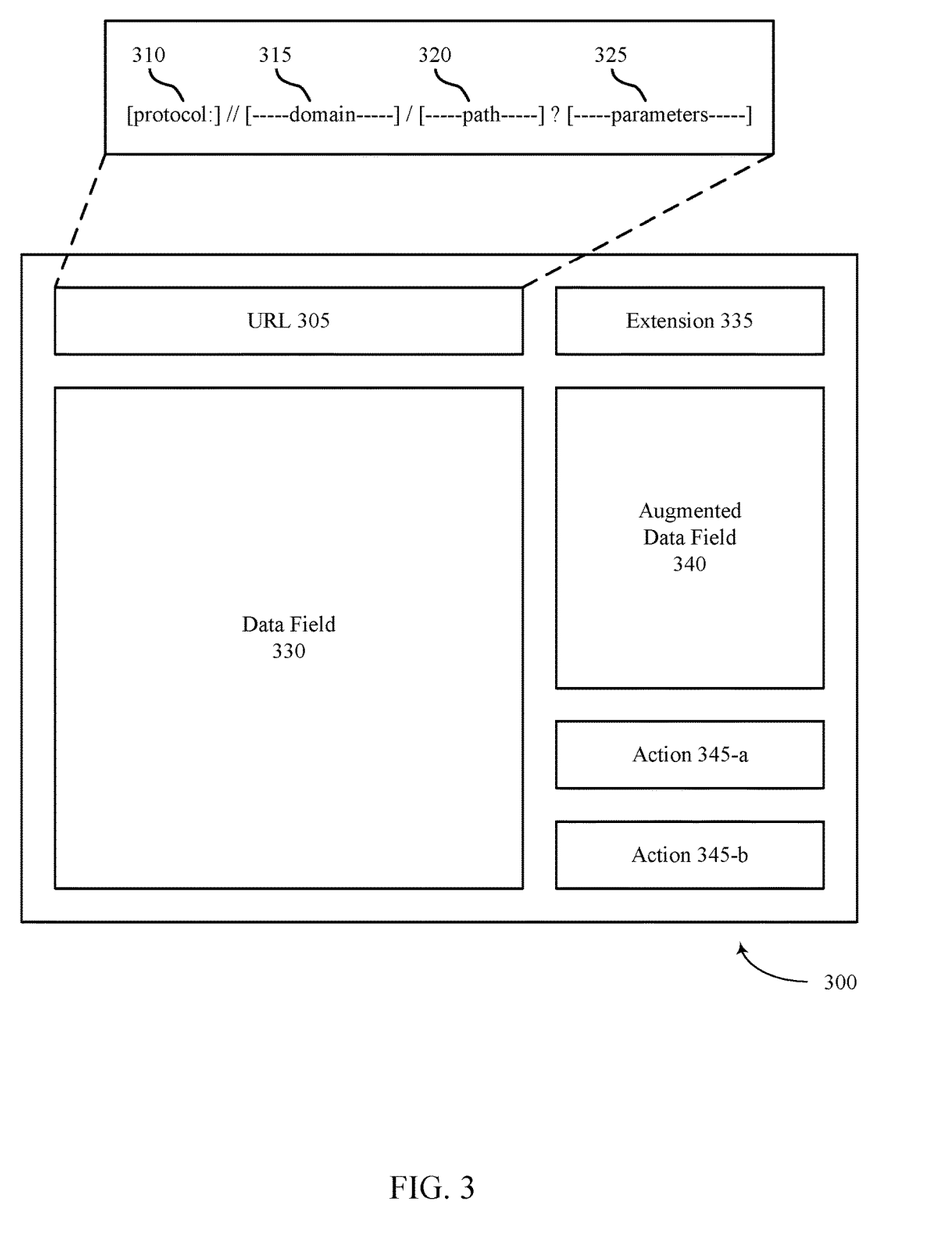
FIG. 3 illustrates an example of a user interface (UI) that supports adaptively linking data between independent systems based on a URL in accordance with aspects of the present disclosure.

FIG. 3 illustrates an example of a user interface (UI) 300 that supports adaptively linking data between independent systems based on a URL in accordance with various aspects of the present disclosure. The UI 300 may include a URL field 305, a data field 330, and an extension button 335. The URL field 305 may display a URL associated with a particular file or resource within a system. A URL may include one or more components or attributes, including a protocol 310, a domain 315, a path 320, and one or more parameters 325.

The UI 300 may additionally include an augmented data field 340 and action buttons. The UI 300 may display the augmented data field 340 and the action buttons based on a user input and/or one or more attributes of the URL field 305. For example, the user may click on extension button 335 in order to generate and display the augmented data field 340 and the action buttons. In some cases, UI 300 may display fewer or more action buttons than action button 345-*a* and action button 345-*b*, as shown in FIG. 3. The UI 300 may allow a user to select an extension button 335 corresponding to an independent system, and may display actions and linked data between independent systems based on the URL field 305.

A web browser may display the URL field 305 and a data field 330 in the UI 300 for a particular file, resource, or webpage. The URL field 305 may display the URL for that file, and the data field 330 may display the data associated with that file (e.g., account information for a particular customer). As described above, a user viewing a file within a first system may wish to view, import, or otherwise manipulate data from a second, independent system. In accordance with aspects of the present disclosure, the user may launch the web browser extension (e.g., by clicking the extension button 335). The web browser extension may already be configured to retrieve data from certain other systems (e.g., the extension may have login credentials for those other systems already saved), or the user may input login or other access credentials for the other systems into the web browser extension.

The web browser extension may then facilitate the process of selecting the appropriate data handlers and sub-handlers based on one or more attributes of the URL, as described above with reference to FIG. 2. For example, a bridge server (e.g., bridge server 210 as described with reference to FIG. 2) may select a data handler based on an attribute of the URL field 305. In some cases, the attribute of the URL field 305 may be a domain 315 of the URL, a path 320 of the URL, or a parameter 325 of the URL. In some cases, the bridge server may select the data handler based on a combination of attributes of the URL field 305. Additionally, in some cases, the bridge server may select sub-handlers based on an attribute of the URL field 305.

The data handler may read data from the first system (e.g., the data displayed in the data field 330). Additionally, the data handler may read data from a second system, where the first system and the second system are independent of each other. In some cases, the data handler may determine whether to read the data from the first system or the second system based on a user input (e.g., a user selecting an action button). In some cases, the data handler may determine whether to read the data from the first system or the second system based on an access level of a user. The access level of the user may be determined based on a user access token. In some cases, the user may have access to some systems, and may not have access to others. For example, the user data handler may read data from the second system based on the access level of the user, but may not read data from a third system based on the same access level. The data handler may generate an augmented set of data based on the data read from the first system and the data read from the second system. The data handler may display the augmented set of data to the user in an augmented data field 340. In some cases, the augmented set of data may be represented as a list of key-value pairs. In some cases, a user may add new data handlers and sub-handlers for the system to select from.

In some cases, the user may also select one or more action buttons, which may trigger the web browser extension to perform an additional action. For example, after the augmented data has been displayed in the augmented data field 340, the user may select action button 345-a, which may instruct the web browser extension to write the augmented set of data to another system. The web browser extension may be configurable such that additional action buttons may be added.

Figure 4:
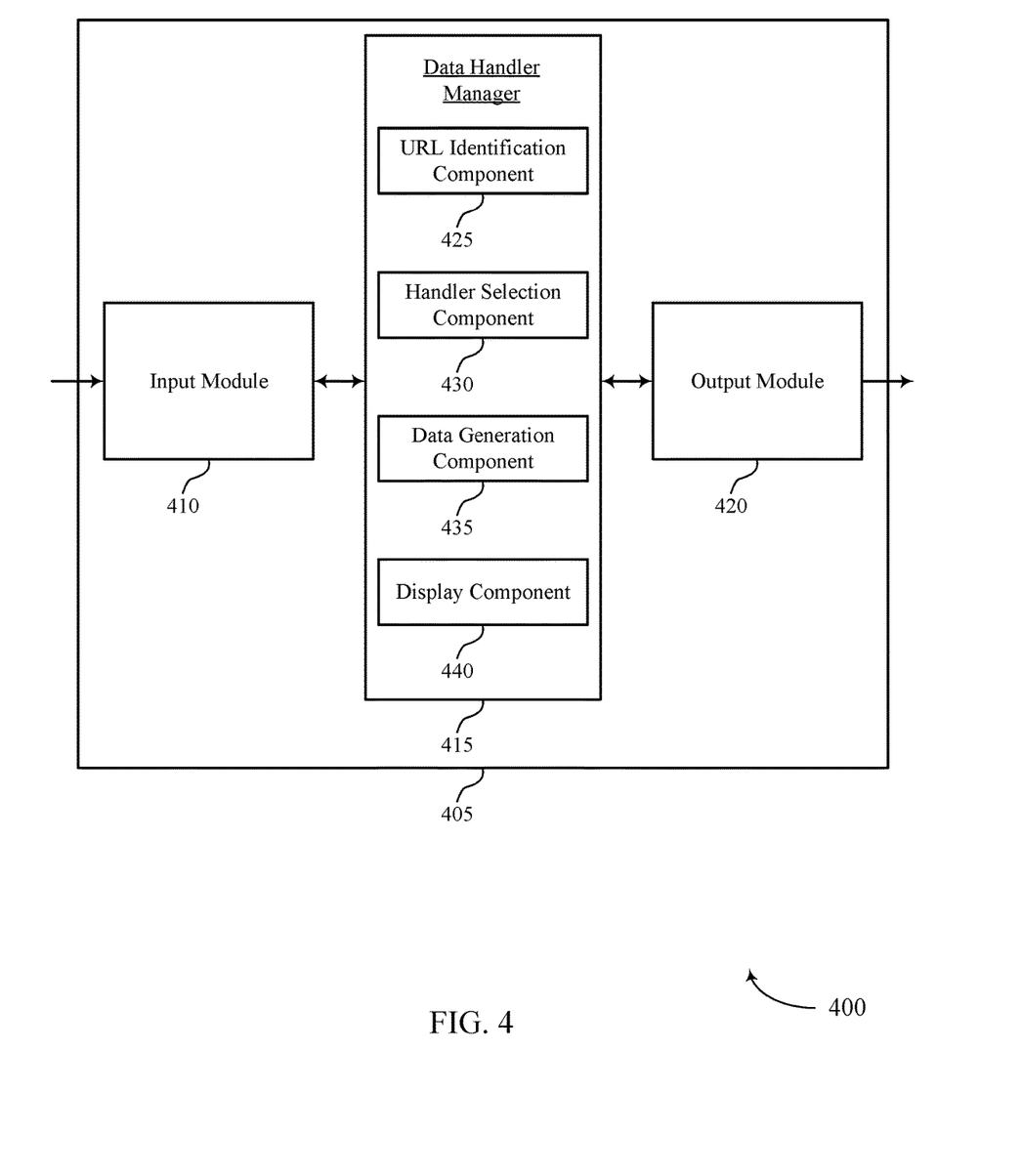
FIG. 4 shows a block diagram of a system that supports adaptively linking data between independent systems based on a URL in accordance with aspects of the present disclosure.

FIG. 4 shows a block diagram 400 of a system 405 that supports adaptively linking data between independent systems based on a URL in accordance with various aspects of the present disclosure. System 405 may include input module 410, data handler manager 415, and output module 420. System 405 may also include a processor. Each of these components may be in communication with one another (e.g., via one or more buses). In some cases, System 405 may be an example of a user terminal, a database server, or a system containing multiple computing devices. Data handler manager 415 may be an example of aspects of the data handler manager 615 described with reference to FIG. 6. Data handler manager 415 may also include URL identification component 425, handler selection component 430, data generation component 435, and display component 440.

Data handler manager 415 and/or at least some of its various sub-components may be implemented in hardware, software executed by a processor, firmware, or any combination thereof. If implemented in software executed by a processor, the functions of the data handler manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The data handler manager 415 and/or at least some of its various sub-components may be physically located at various positions, including being distributed such that portions of functions are implemented at different physical locations by one or more physical devices. In some examples, data handler manager 415 and/or at least some of its various sub-components may be a separate and distinct component in accordance with various aspects of the present disclosure. In other examples, data handler manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

URL identification component 425 may receive a URL from a web browser, where the URL corresponds to a first system and identify an attribute of the URL, where the attribute of the URL includes a domain of the URL, a path of the URL, one or more parameters of the URL, or a combination thereof. Handler selection component 430 may select a data handler based on the identified attribute of the URL.

Data generation component 435 may generate an augmented set of data based on a first set of data from the first system and a second set of data from a second system, where the augmented set of data is generated using the data handler. In some cases, the augmented set of data is generated based on an access token of a user.

Display component 440 may modify a display of an extension of the web browser based on the augmented set of data. In some cases, the modifying the display includes displaying an indication of the action. In some cases, the modifying the display includes displaying the augmented data.

Figure 5:
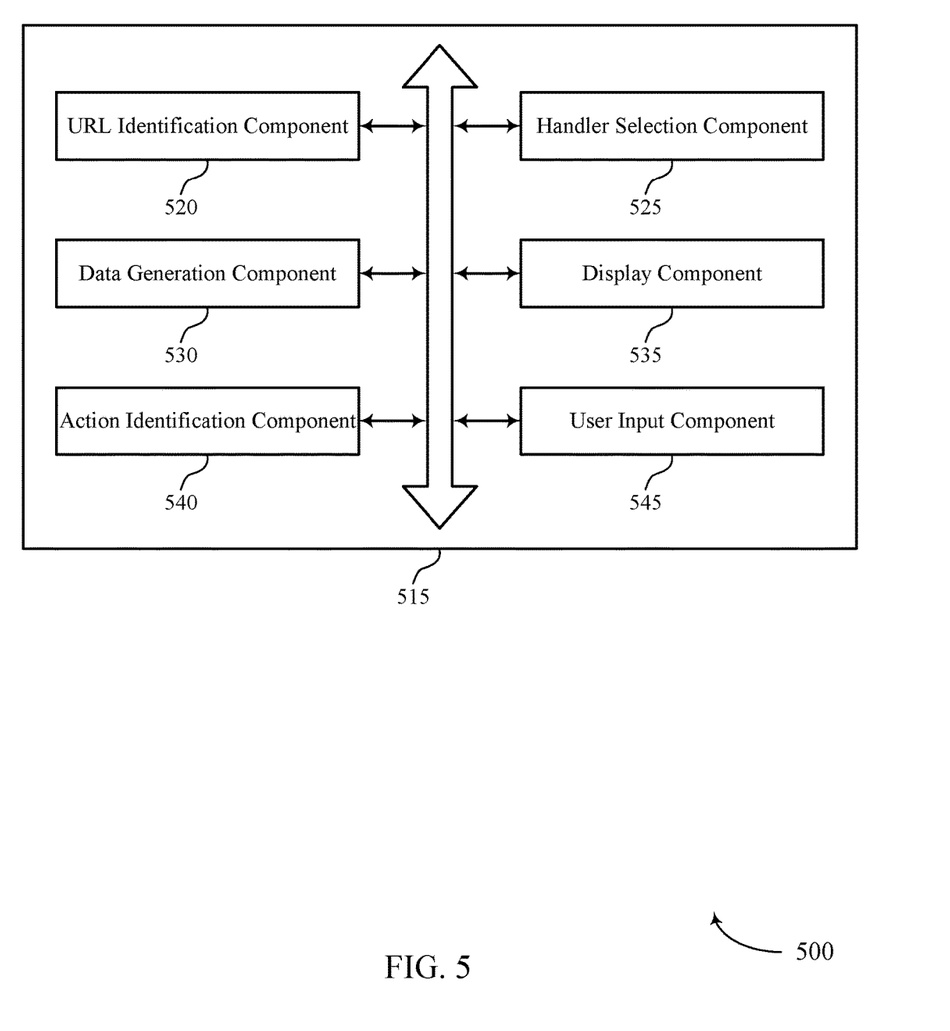
FIG. 5 shows a block diagram of a data handler manager that supports adaptively linking data between independent systems based on a URL in accordance with aspects of the present disclosure.

FIG. 5 shows a block diagram 500 of a data handler manager 515 that supports adaptively linking data between independent systems based on a URL in accordance with various aspects of the present disclosure. The data handler manager 515 may be an example of aspects of a data handler manager 615 described with reference to FIGS. 3, 4, and 6. The data handler manager 515 may include URL identification component 520, handler selection component 525, data generation component 530, display component 535, action identification component 540, and user input component 545. Each of these modules may communicate, directly or indirectly, with one another (e.g., via one or more buses).

URL identification component 520 may receive a URL from a web browser, where the URL corresponds to a first system and identify an attribute of the URL, where the attribute of the URL includes a domain of the URL, a path of the URL, one or more parameters of the URL, or a combination thereof. Handler selection component 525 may select a data handler based on the identified attribute of the URL.

Data generation component 530 may generate an augmented set of data based on a first set of data from the first system and a second set of data from a second system, where the augmented set of data is generated using the data handler. In some cases, the augmented set of data is generated based on an access token of a user.

Display component 535 may modify a display of an extension of the web browser based on the augmented set of data. In some cases, the modifying the display includes displaying an indication of the action. In some cases, the modifying the display includes displaying the augmented data.

Action identification component 540 may identify an action to perform based on the identified attribute of the URL, the augmented set of data, or a combination thereof and identify the action based on an access token of a user.

User input component 545 may receive an input from a user to perform the action, receive an input from a user to create a custom action, and receive an input from a user to create a custom data handler.

Figure 6:
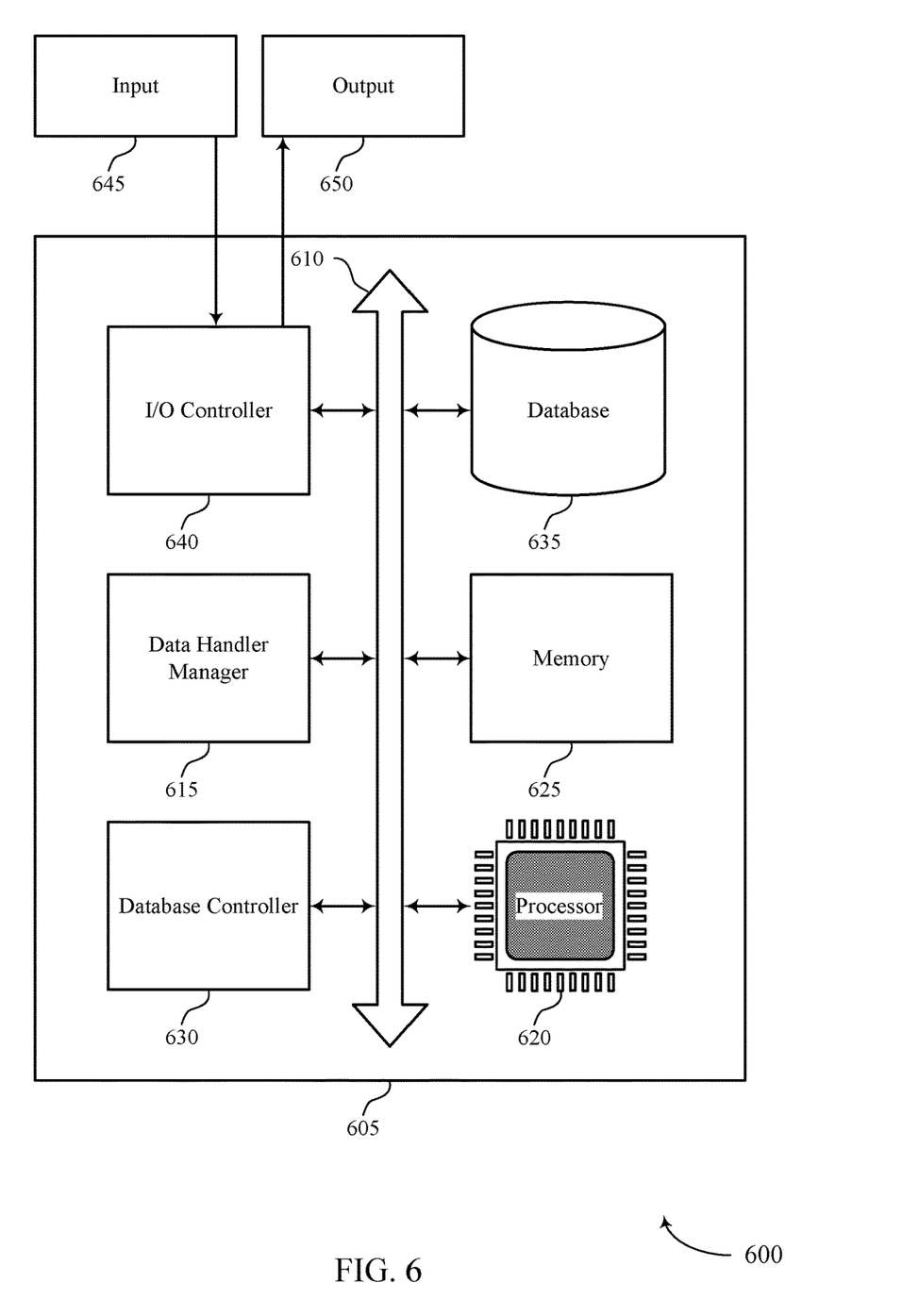
FIG. 6 illustrates a block diagram of an environment including a data handler manager that supports adaptively linking data between independent systems based on a URL in accordance with aspects of the present disclosure.

FIG. 6 shows a diagram of an environment 600 including a system 605 that supports adaptively linking data between independent systems based on a URL in accordance with various aspects of the present disclosure. System 605 may be an example of or include the components of system 125 as described above, e.g., with reference to FIG. 1. System 605 may include components for bi-directional data communications including components for transmitting and receiving communications, including data handler manager 615, processor 620, memory 625, database controller 630, database 635, and I/O controller 640. These components may be in electronic communication via one or more busses (e.g., bus 610).

Processor 620 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 620 may be configured to operate a memory array using a memory controller. In other cases, a memory controller may be integrated into processor 620. Processor 620 may be configured to execute computer-readable instructions stored in a memory to perform various functions (e.g., functions or tasks supporting adaptively linking data between independent systems based on a URL).

Memory 625 may include random access memory (RAM) and read only memory (ROM). The memory 625 may store computer-readable, computer-executable software 630 including instructions that, when executed, cause the processor to perform various functions described herein. In some cases, the memory 625 may contain, among other things, a basic input/output system (BIOS) which may control basic hardware and/or software operation such as the interaction with peripheral components or devices.

Database controller 630 may manage data storage and processing in database 635. In some cases, a user may interact with database controller 630. In other cases, database controller 630 may operate automatically without user interaction. Database 635 may be an example of a single database, a distributed database, multiple distributed databases, or an emergency backup database.

I/O controller 640 may manage input signals 645 and output signals 650 for device 605. I/O controller 640 may also manage peripherals not integrated into device 605. In some cases, I/O controller 640 may represent a physical connection or port to an external peripheral. In some cases, I/O controller 640 may utilize an operating system such as iOS®, ANDROID®, MS-DOS®, MS-WINDOWS®, OS/2®, UNIX®, LINUX®, or another known operating system. In other cases, I/O controller 640 may represent or interact with a modem, a keyboard, a mouse, a touchscreen, or a similar device. In some cases, I/O controller 640 may be implemented as part of a processor. In some cases, a user may interact with device 605 via I/O controller 640 or via hardware components controlled by I/O controller 640.

Figure 7:
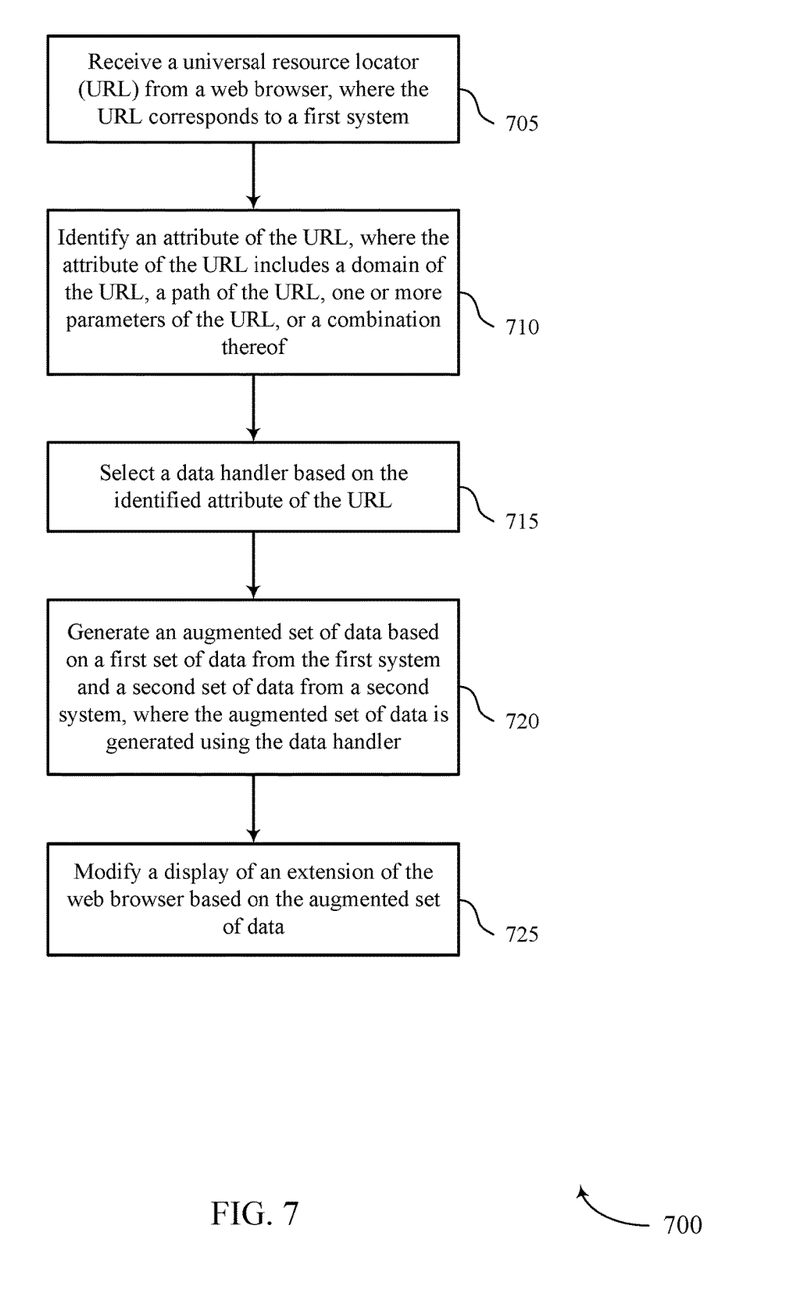
FIGS. 7 through 8 illustrate methods for adaptively linking data between independent systems based on a URL in accordance with aspects of the present disclosure.

FIG. 7 shows a flowchart illustrating a method 700 for adaptively linking data between independent systems based on a URL in accordance with various aspects of the present disclosure. The operations of method 700 may be implemented by a data handler manager or its components as described herein. For example, the operations of method 700 may be performed by a data handler manager 415, 515, or 615 as described with reference to FIGS. 4 through 6. In some examples, a data handler manager may execute a set of codes to control the functional elements of the device to perform the functions described below. Additionally or alternatively, the data handler manager may perform aspects of the functions described below using special-purpose hardware.

At block 705 the data handler manager (e.g., a data handler manager 415, 515, or 615) may receive a URL from a web browser, wherein the URL corresponds to a first system. The operations of block 705 may be performed according to the methods described with reference to FIGS. 1 through 3. In certain examples, aspects of the operations of block 705 may be performed by a URL identification component as described with reference to FIGS. 4 through 6.

At block 710 the data handler manager (e.g., a data handler manager 415, 515, or 615) may identify an attribute of the URL, wherein the attribute of the URL comprises a domain of the URL, a path of the URL, one or more parameters of the URL, or a combination thereof. The operations of block 710 may be performed according to the methods described with reference to FIGS. 1 through 3. In certain examples, aspects of the operations of block 710 may be performed by a URL identification component as described with reference to FIGS. 4 through 6.

At block 715 the data handler manager (e.g., a data handler manager 415, 515, or 615) may select a data handler based at least in part on the identified attribute of the URL. The operations of block 715 may be performed according to the methods described with reference to FIGS. 1 through 3. In certain examples, aspects of the operations of block 715 may be performed by a handler selection component as described with reference to FIGS. 4 through 6.

At block 720 the data handler manager (e.g., a data handler manager 415, 515, or 615) may generate an augmented set of data based at least in part on a first set of data from the first system and a second set of data from a second system, wherein the augmented set of data is generated using the data handler. The operations of block 720 may be performed according to the methods described with reference to FIGS. 1 through 3. In certain examples, aspects of the operations of block 720 may be performed by a data generation component as described with reference to FIGS. 4 through 6.

At block 725 the data handler manager (e.g., a data handler manager 415, 515, or 615) may modify a display of an extension of the web browser based at least in part on the augmented set of data. The operations of block 725 may be performed according to the methods described with reference to FIGS. 1 through 3. In certain examples, aspects of the operations of block 725 may be performed by a display component as described with reference to FIGS. 4 through 6.

Figure 8:
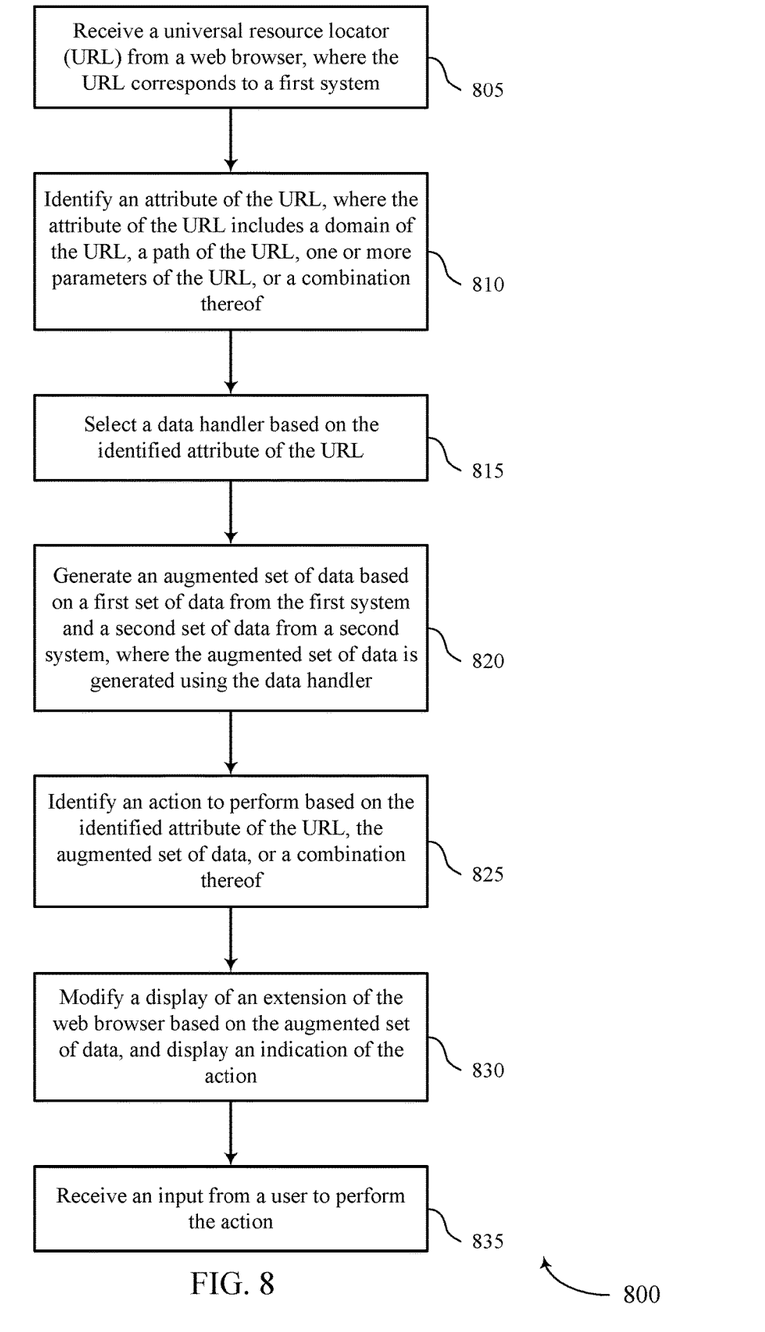

FIG. 8 shows a flowchart illustrating a method 800 for adaptively linking data between independent systems based on a URL in accordance with various aspects of the present disclosure. The operations of method 800 may be implemented by a data handler manager or its components as described herein. For example, the operations of method 800 may be performed by a data handler manager 415, 515, or 615 as described with reference to FIGS. 4 through 6. In some examples, a data handler manager may execute a set of codes to control the functional elements of the device to perform the functions described below. Additionally or alternatively, the data handler manager may perform aspects of the functions described below using special-purpose hardware.

At block 805 the data handler manager (e.g., a data handler manager 415, 515, or 615) may receive a URL from a web browser, wherein the URL corresponds to a first system. The operations of block 805 may be performed according to the methods described with reference to FIGS. 1 through 3. In certain examples, aspects of the operations of block 805 may be performed by a URL identification component as described with reference to FIGS. 4 through 6.

At block 810 the data handler manager (e.g., a data handler manager 415, 515, or 615) may identify an attribute of the URL, wherein the attribute of the URL comprises a domain of the URL, a path of the URL, one or more parameters of the URL, or a combination thereof. The operations of block 810 may be performed according to the methods described with reference to FIGS. 1 through 3. In certain examples, aspects of the operations of block 810 may be performed by a URL identification component as described with reference to FIGS. 4 through 6.

At block 815 the data handler manager (e.g., a data handler manager 415, 515, or 615) may select a data handler based at least in part on the identified attribute of the URL. The operations of block 815 may be performed according to the methods described with reference to FIGS. 1 through 3. In certain examples, aspects of the operations of block 815 may be performed by a handler selection component as described with reference to FIGS. 4 through 6.

At block 820 the data handler manager (e.g., a data handler manager 415, 515, or 615) may generate an augmented set of data based at least in part on a first set of data from the first system and a second set of data from a second system, wherein the augmented set of data is generated using the data handler. The operations of block 820 may be performed according to the methods described with reference to FIGS. 1 through 3. In certain examples, aspects of the operations of block 820 may be performed by a data generation component as described with reference to FIGS. 4 through 6.

At block 825 the data handler manager (e.g., a data handler manager 415, 515, or 615) may identify an action to perform based at least in part on the identified attribute of the URL, the augmented set of data, or a combination thereof. The operations of block 825 may be performed according to the methods described with reference to FIGS. 1 through 3. In certain examples, aspects of the operations of block 825 may be performed by an action identification component as described with reference to FIGS. 4 through 6.

At block 830 the data handler manager (e.g., a data handler manager 415, 515, or 615) may modify a display of an extension of the web browser based at least in part on the augmented set of data. In some cases, modifying the display comprises displaying an indication of the action. The operations of block 830 may be performed according to the methods described with reference to FIGS. 1 through 3. In certain examples, aspects of the operations of block 830 may be performed by a display component as described with reference to FIGS. 4 through 6.

At block 835 the data handler manager (e.g., a data handler manager 415, 515, or 615) may receive an input from a user to perform the action. The operations of block 835 may be performed according to the methods described with reference to FIGS. 1 through 3. In certain examples, aspects of the operations of block 835 may be performed by a user input component as described with reference to FIGS. 4 through 6.

A method of communication data processing is described. The method may include receiving a URL from a web browser, wherein the URL corresponds to a first system, identifying an attribute of the URL, wherein the attribute of the URL comprises a domain of the URL, a path of the URL, one or more parameters of the URL, or a combination thereof, selecting a data handler based at least in part on the identified attribute of the URL, generating an augmented set of data based at least in part on a first set of data from the first system and a second set of data from a second system, wherein the augmented set of data is generated using the data handler, and modifying a display of an extension of the web browser based at least in part on the augmented set of data.

Another apparatus for communication data processing is described. The apparatus may include a processor, memory in electronic communication with the processor, and instructions stored in the memory. The instructions may be operable to cause the processor to receive a URL from a web browser, wherein the URL corresponds to a first system, identify an attribute of the URL, wherein the attribute of the URL comprises a domain of the URL, a path of the URL, one or more parameters of the URL, or a combination thereof, select a data handler based at least in part on the identified attribute of the URL, generate an augmented set of data based at least in part on a first set of data from the first system and a second set of data from a second system, wherein the augmented set of data is generated using the data handler, and modify a display of an extension of the web browser based at least in part on the augmented set of data.

A non-transitory computer readable medium for communication data processing is described. The non-transitory computer-readable medium may include instructions operable to cause a processor to receive a URL from a web browser, wherein the URL corresponds to a first system, identify an attribute of the URL, wherein the attribute of the URL comprises a domain of the URL, a path of the URL, one or more parameters of the URL, or a combination thereof, select a data handler based at least in part on the identified attribute of the URL, generate an augmented set of data based at least in part on a first set of data from the first system and a second set of data from a second system, wherein the augmented set of data is generated using the data handler, and modify a display of an extension of the web browser based at least in part on the augmented set of data.

Some examples of the method, apparatus, and non-transitory computer-readable medium described above may further include processes, features, means, or instructions for identifying an action to perform based at least in part on the identified attribute of the URL, the augmented set of data, or a combination thereof.

In some examples of the method, apparatus, and non-transitory computer-readable medium described above, the modifying the display comprises displaying an indication of the action.

Some examples of the method, apparatus, and non-transitory computer-readable medium described above may further include processes, features, means, or instructions for receiving an input from a user to perform the action.

Some examples of the method, apparatus, and non-transitory computer-readable medium described above may further include processes, features, means, or instructions for identifying the action based at least in part on an access token of a user.

In some examples of the method, apparatus, and non-transitory computer-readable medium described above, the modifying the display comprises displaying the augmented data.

In some examples of the method, apparatus, and non-transitory computer-readable medium described above, the augmented set of data may be generated based at least in part on an access token of a user.

Some examples of the method, apparatus, and non-transitory computer-readable medium described above may further include processes, features, means, or instructions for receiving an input from a user to create a custom action.

Some examples of the method, apparatus, and non-transitory computer-readable medium described above may further include processes, features, means, or instructions for receiving an input from a user to create a custom data handler.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for communication data processing, comprising:
    launching a web browser extension for a web browser, wherein the web browser extension is configured to access a plurality of systems based at least in part on input from a user;
    initiating a process for linking the plurality of systems based at least in part on a user input to a user interface of the web browser extension;
    receiving a universal resource locator (URL) from the web browser based at least in part on the initiating of the process for linking the plurality of systems, wherein the URL is associated with a first file or webpage and corresponds to a first system of the plurality of systems;

identifying an attribute of the URL, wherein the attribute of the URL comprises a domain of the URL, a path of the URL, one or more parameters of the URL, or a combination thereof;

selecting a data handler from a plurality of data handlers based at least in part on the identified attribute of the URL, wherein the data handler comprises a program or process to link data from at least a second system of the plurality of systems to the first system;

identifying, based at least in part on the URL, a first set of data displayed in the first file or webpage, wherein the first set of data is stored in the first system according to a first data format;

generating an augmented set of data based at least in part on the first set of data and a second set of data from the second system, wherein the augmented set of data is generated using the data handler by converting the second set of data from a second data format to the first data format, and wherein the second set of data is stored in the second system according to the second data format; and modifying a display of the web browser extension of the web browser based at least in part on the augmented set of data, wherein the augmented set of data is displayed according to the first data format in the user interface of the web browser extension.

2. The method of claim 1, further comprising:
identifying an action to perform based at least in part on the identified attribute of the URL, the augmented set of data, or a combination thereof.

3. The method of claim 2, wherein modifying the display comprises displaying an indication of the action.

4. The method of claim 2, further comprising: receiving an additional user input in the user interface of the web browser extension from the user to perform the action, wherein performing the action comprises the generating of the augmented set of data, writing the augmented set of data to a third system of the plurality of systems, or a combination thereof.

5. The method of claim 2, further comprising: identifying the action based at least in part on an access token of the user.

6. The method of claim 1, wherein the augmented set of data is generated based at least in part on an access token of the user.

7. The method of claim 6, wherein the access token of the user comprises user login credentials for the second system, the method further comprising: receiving, from the user, the user login credentials for the second system in the user interface of the web browser extension; saving the user login credentials for the second system; and accessing, based at least in part on the initiating of the process for linking the plurality of systems, the second set of data from the second system using the saved user login credentials for the second system, wherein generating the augmented set of data is further based at least in part on the accessing.

8. The method of claim 7, wherein the second set of data is accessed from the second system while the first file or webpage corresponding to the first system is displayed in the web browser.

9. The method of claim 1, further comprising: receiving an input from the user to create a custom action.

10. The method of claim 1, further comprising: receiving an input from the user to create a custom data handler, wherein the custom data handler comprises a custom program or process for linking data between the plurality of systems; and adding the custom data handler to the plurality of data handlers.

11. An apparatus for communication data processing, in a system comprising: a processor; memory in electronic communication with the processor; and instructions stored in the memory and operable, when executed by the processor, to cause the apparatus to:

launching a web browser extension for a web browser, wherein the web browser extension is configured to access a plurality of systems based at least in part on input from a user;

initiating a process for linking the plurality of systems based at least in part on a user input to a user interface of the web browser extension;

receiving a universal resource locator (URL) from the web browser based at least in part on the initiating of the process for linking the plurality of systems, wherein the URL is associated with a first file or webpage and corresponds to a first system of the plurality of systems;

identifying an attribute of the URL, wherein the attribute of the URL comprises a domain of the URL, a path of the URL, one or more parameters of the URL, or a combination thereof;

selecting a data handler from a plurality of data handlers based at least in part on the identified attribute of the URL, wherein the data handler comprises a program or process to link data from at least a second system of the plurality of systems to the first system;

identifying, based at least in part on the URL, a first set of data displayed in the first file or webpage, wherein the first set of data is stored in the first system according to a first data format;

generating an augmented set of data based at least in part on the first set of data and a second set of data from the second system, wherein the augmented set of data is generated using the data handler by converting the second set of data from a second data format to the first data format, and wherein the second set of data is stored in the second system according to the second data format; and modifying a display of the web browser extension of the web browser based at least in part on the augmented set of data, wherein the augmented set of data is displayed according to the first data format in the user interface of the web browser extension.

12. The apparatus of claim 11, wherein the instructions are further executable by the processor to:
identify an action to perform based at least in part on the identified attribute of the URL, the augmented set of data, or a combination thereof.

13. The apparatus of claim 12, wherein the instructions are further executable by the processor to: receive an additional user input in the user interface of the web browser extension from the user to perform the action, wherein performing the action comprises the generating of the augmented set of data, writing the augmented set of data to a third system of the plurality of systems, or a combination thereof.

14. The apparatus of claim 11, wherein the instructions are further executable by the processor to: receive an input from the user to create a custom action.

15. The apparatus of claim 11, wherein the instructions are further executable by the processor to: receive an input from the user to create a custom data handler, wherein the custom data handler comprises a custom program or process for linking data between the plurality of systems; and add the custom data handler to the plurality of data handlers.

16. A non-transitory computer readable medium storing code for communication data processing, the code comprising instructions executable by a processor to:
launching a web browser extension for a web browser, wherein the web browser extension is configured to access a plurality of systems based at least in part on input from a user;
initiating a process for linking the plurality of systems based at least in part on a user input to a user interface of the web browser extension;
receiving a universal resource locator (URL) from the web browser based at least in part on the initiating of the process for linking the plurality of systems, wherein the URL is associated with a first file or webpage and corresponds to a first system of the plurality of systems;
identifying an attribute of the URL, wherein the attribute of the URL comprises a domain of the URL, a path of the URL, one or more parameters of the URL, or a combination thereof;
selecting a data handler from a plurality of data handlers based at least in part on the identified attribute of the URL, wherein the data handler comprises a program or process to link data from at least a second system of the plurality of systems to the first system;
identifying, based at least in part on the URL, a first set of data displayed in the first file or webpage, wherein the first set of data is stored in the first system according to a first data format;
generating an augmented set of data based at least in part on the first set of data and a second set of data from the second system, wherein the augmented set of data is generated using the data handler by converting the second set of data from a second data format to the first data format, and wherein the second set of data is stored in the second system according to the second data format; and
modifying a display of the web browser extension of the web browser based at least in part on the augmented set of data, wherein the augmented set of data is displayed according to the first data format in the user interface of the web browser extension.

17. The non-transitory computer-readable medium of claim 16, wherein the instructions are further executable by the processor to:
identify an action to perform based at least in part on the identified attribute of the URL, the augmented set of data, or a combination thereof.

18. The non-transitory computer-readable medium of claim 17, wherein the instructions are further executable by the processor to: receive an additional user input in the user interface of the web browser extension from the user to perform the action, wherein performing the action comprises the generating of the augmented set of data, writing the augmented set of data to a third system of the plurality of systems, or a combination thereof.

19. The non-transitory computer-readable medium of claim 16, wherein the instructions are further executable by the processor to: receive an input from the user to create a custom action.

20. The non-transitory computer-readable medium of claim 16, wherein the instructions are further executable by the processor to: receive an input from the user to create a custom data handler, wherein the custom data handler comprises a custom program or process for linking data between the plurality of systems; and add the custom data handler to the plurality of data handlers.

* * * * *